US012283200B1

(12) United States Patent
Xu

(10) Patent No.: US 12,283,200 B1
(45) Date of Patent: Apr. 22, 2025

(54) FLIP SCREEN WITH REPLACEABLE MATERIALS AND ADJUSTABLE SCREEN TILT ANGLE

(71) Applicant: Zeyan Xu, Guangdong (CN)

(72) Inventor: Zeyan Xu, Guangdong (CN)

( * ) Notice: Subject to any disclaimer, the term of this patent is extended or adjusted under 35 U.S.C. 154(b) by 0 days.

(21) Appl. No.: 19/016,944

(22) Filed: Jan. 10, 2025

(51) Int. Cl.
*G09F 11/06* (2006.01)

(52) U.S. Cl.
CPC .................................... *G09F 11/06* (2013.01)

(58) Field of Classification Search
CPC ...................................................... G09F 11/06
See application file for complete search history.

(56) References Cited

U.S. PATENT DOCUMENTS 3,890,727 A * 6/1975 Rose ....................... G09F 11/02 40/379
4,021,947 A * 5/1977 Shneider ................. G09F 11/06 40/379
5,289,651 A * 3/1994 Byers ....................... G09F 11/06 40/500
5,477,630 A * 12/1995 Tornow ................... G09F 11/06 40/531

FOREIGN PATENT DOCUMENTS

JP 05229294 A * 9/1993

* cited by examiner

*Primary Examiner* — Gary C Hoge

(57) ABSTRACT

The present application disclosed a flip screen with replaceable materials and adjustable screen tilt angle. Which comprising a U-shaped base, a crank handle, a polygonal rotating shaft, a left-fixed round plate, a right-fixed round plate, a damping plate, a side plug-in plate, and a damping arm. Pictures or images made from various materials can be securely clamped into the installation groove, allowing them to be supported by the side plug-in plate. This design extends the service life of the flip screen and does not impose strict requirements on the materials used for the images, enhancing its practicality.

4 Claims, 11 Drawing Sheets

FLIP SCREEN WITH REPLACEABLE MATERIALS AND ADJUSTABLE SCREEN TILT ANGLE

FIELD OF THE APPLICATION

The present application relates to the technical field of ornaments. More specifically, the present application relates to flip screen with replaceable materials and adjustable screen tilt angle.

BACKGROUND

Currently, the ornamental flip screens available on the market are primarily made from customized paper, which requires specific standards for size, material, and shape. The type of paper used significantly impacts the longevity of the flip screen.

Additionally, flip screens are often designed for business customization or arranged in a matrix format, making them less accessible for ordinary households. Most flip screens are either vertical or horizontal, utilizing top and bottom buckles to keep the image flat; however, the tilt angle of the screen cannot be adjusted, which greatly restricts the viewing angle.

To address these issues, a flip screen has been designed with replaceable materials and an adjustable screen tilt angle.

SUMMARY

The technical problem to be solved by the present invention is to overcome the defects of the above-mentioned technology and provide a flip screen with replaceable materials and adjustable screen tilt angle.

A flip screen with replaceable materials and adjustable screen tilt angle, comprising a U-shaped base, a crank handle, a polygonal shaft, a left fixed round plate, a right fixed round plate, a damping plate, a side plug plate and a damping arm, wherein a round hole is provided on the upper end of the U-shaped base and the damping plate, and the round hole passes through the U-shaped base and the damping plate respectively, the polygonal shaft is arranged in the round hole on the U-shaped base, and the round holes are extended from both ends of the polygonal shaft, and a connecting rod is provided on one side of the right fixed round plate; wherein the right fixed round plate and the left fixed round plate are both provided with a first polygonal hole, the first polygonal hole on the right fixed round plate passes through the connecting rod, the left fixed round plate, the right fixed round plate and the connecting rod are all sleeved on the polygonal shaft through the first polygonal hole, the connecting rod passes through the round hole and extends to the outside of the U-shaped base, the left fixed round plate and the right fixed round plate are both located on the inside of the U-shaped base, and the left fixed round plate and the right fixed round plate are on the polygonal shaft. A sleeve is provided at a position between the right and left fixed round plates; a plurality of plug holes are evenly provided on the left and right fixed round plates; the plug holes are provided with side plug plates in a detachable manner; a plurality of plug holes are provided on one side of the U-shaped base; a sleeve is provided on one side of the damping plate; a plurality of slots are evenly provided on the circumference of the sleeve; a plurality of plug rods are provided on the sleeve; the plug rods and the plug holes are connected and matched; a installation hole is provided at the lower end of the damping arm; wherein a plurality of card plates are evenly arranged on the inner wall of the installation hole, the damping arm is rotatably connected to the sleeve through the installation hole, the card plate cooperates with the card slot to position and adjust the angle of the damping arm, the damping arm is provided with a limit slot at the upper end, the limit slot cooperates with the upper end of the corresponding side plug plate to position the side plug plate, the crank handle is provided with a second polygonal slot, the crank handle is connected and cooperated with the polygonal shaft through the second polygonal slot.

Wherein an installation slot is provided on one side of the upper end of the side plug plate.

As an improvement, a plug rod is provided at the bottom of the side plug plate, connected and matched with the plug-in hole, and multiple protrusions are provided on the inner walls on both sides of the installation slot.

As an improvement, the crank handle and the damping arm are located on both sides of the U-shaped base.

As an improvement, screw holes are provided at both ends of the polygonal rotating shaft, bolts are provided in the screw holes, and the bolts fix the damping plate and the crank handle respectively.

The advantages of the present invention compared to the prior art are as follows:

1. The design includes a side plug plate that can be easily detached, along with multiple plug holes evenly distributed on both the left and right fixed round plates. This configuration allows for the installation of several side plug plates. Each side plug plate features installation slots, enabling users to insert images or paper pictures on both sides. As a result, these images are supported by the side plug plates, which extends the service life of the flip screen. Additionally, there are no strict requirements for the materials used for the pictures, enhancing overall practicality.
2. A sleeve is attached to one side of the damping plate, and several slots are evenly arranged around its circumference. The sleeve features multiple plug rods that connect and align with corresponding plug holes. At the lower end of the damping arm, there is a mounting hole with several clamping plates evenly positioned along its inner wall. The damping arm is rotatably connected to the sleeve via the mounting hole, and the clamping plates work in conjunction with the slots to position and adjust the angle of the damping arm. Additionally, a limiting slot is located at the upper end of the damping arm. This limiting slot interacts with the upper end of the corresponding side plug-in plate to securely position the side plug-in plate. This setup allows for the adjustment of the inclination angle of the picture screen, fixing it in place at the desired angle. This design provides users with the convenience to make adjustments based on their preferences, enhancing the overall viewing experience.
3. The current invention enhances the customization service of page-turning screens, making it more accessible for everyone to create page-turning albums, menus, animated images, promotional materials, and more.

BRIEF DESCRIPTION OF THE DRAWINGS

As shown in FIGS. 1-11:

100. U-shaped base,
101. round hole,
102. plug hole,
200. crank handle,
201. second polygonal slot,
300. polygonal shaft,
301. sleeve,
302. bolt,
303. screw hole,
400. left fixed round plate,
401. first polygonal hole,
402. plug hole,
500. right fixed round plate,
501. connecting rod,
600. damping plate,
601. sleeve,
602. slot,
603. plug rod,
700. side plug plate,
701. installation slot,
702. protrusion,
703. plug rod,
800. damping arm,
801. installation hole,
802. card plate,
803. limit slot While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms platelosed in the following detailed description. Rather, the embodiments are chosen and described so that others skilled in the art can appreciate and understand the principles and practices of the present technology.

All publications and patents mentioned herein are hereby incorporated by reference. The publications and patents platelosed herein are provided solely for their disclosure. Nothing herein is to be construed as an admission that the inventors are not entitled to antedate any publication and/or patent, including any publication and/or patent cited herein.

Figure 1:
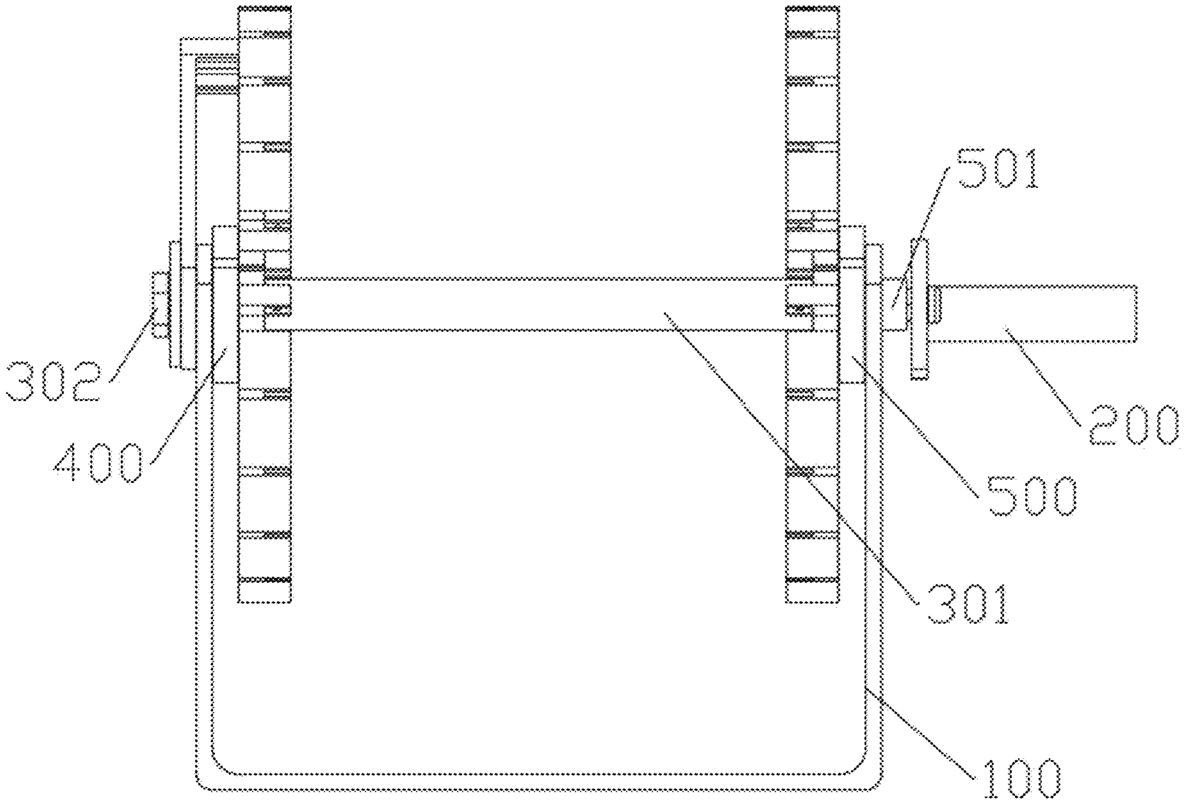
FIG. 1 is a front view of the flip screen with replaceable materials and adjustable screen tilt angle thereof.
Figure 2:
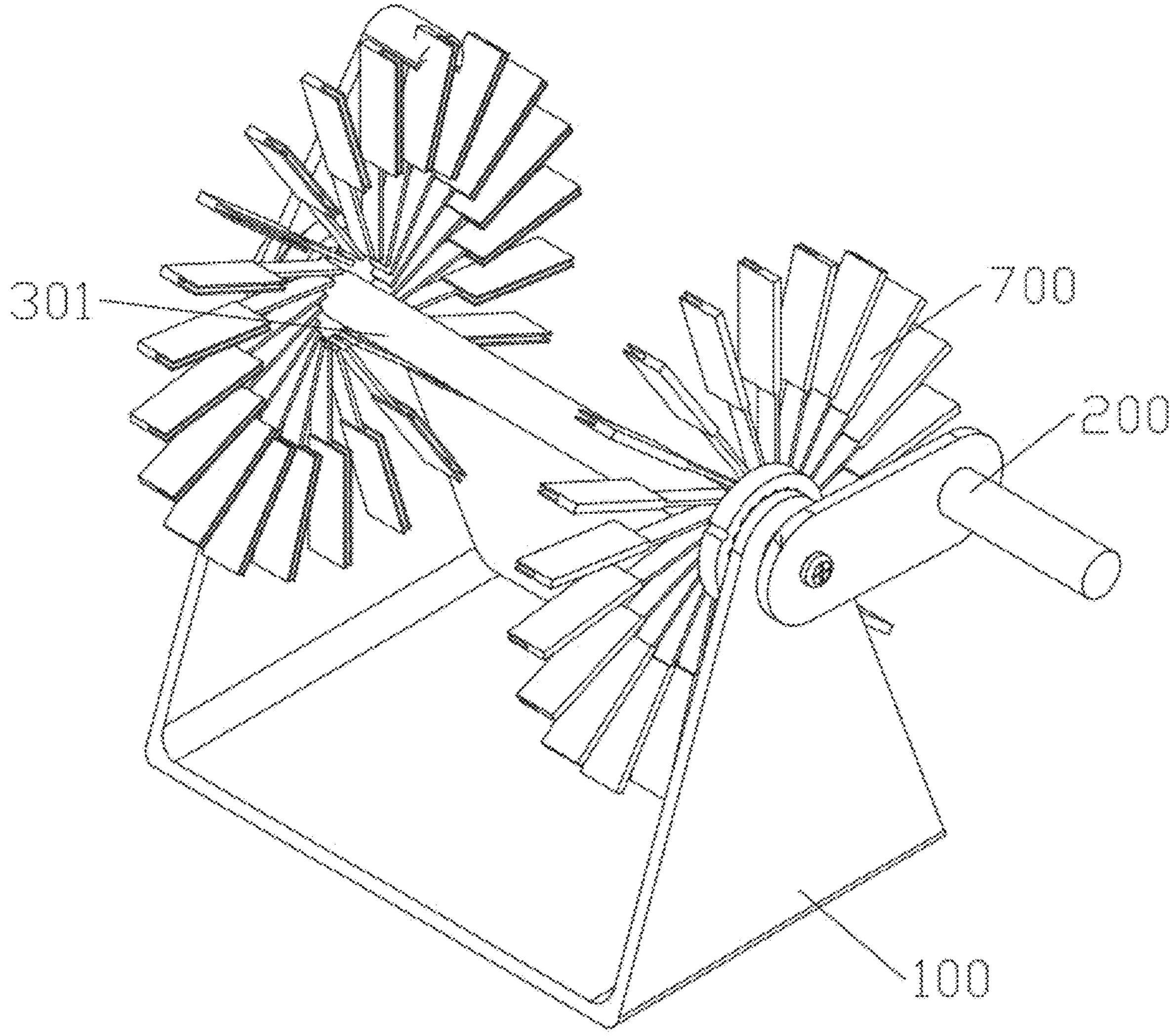
FIG. 2 is a perspective view thereof.
Figure 3:
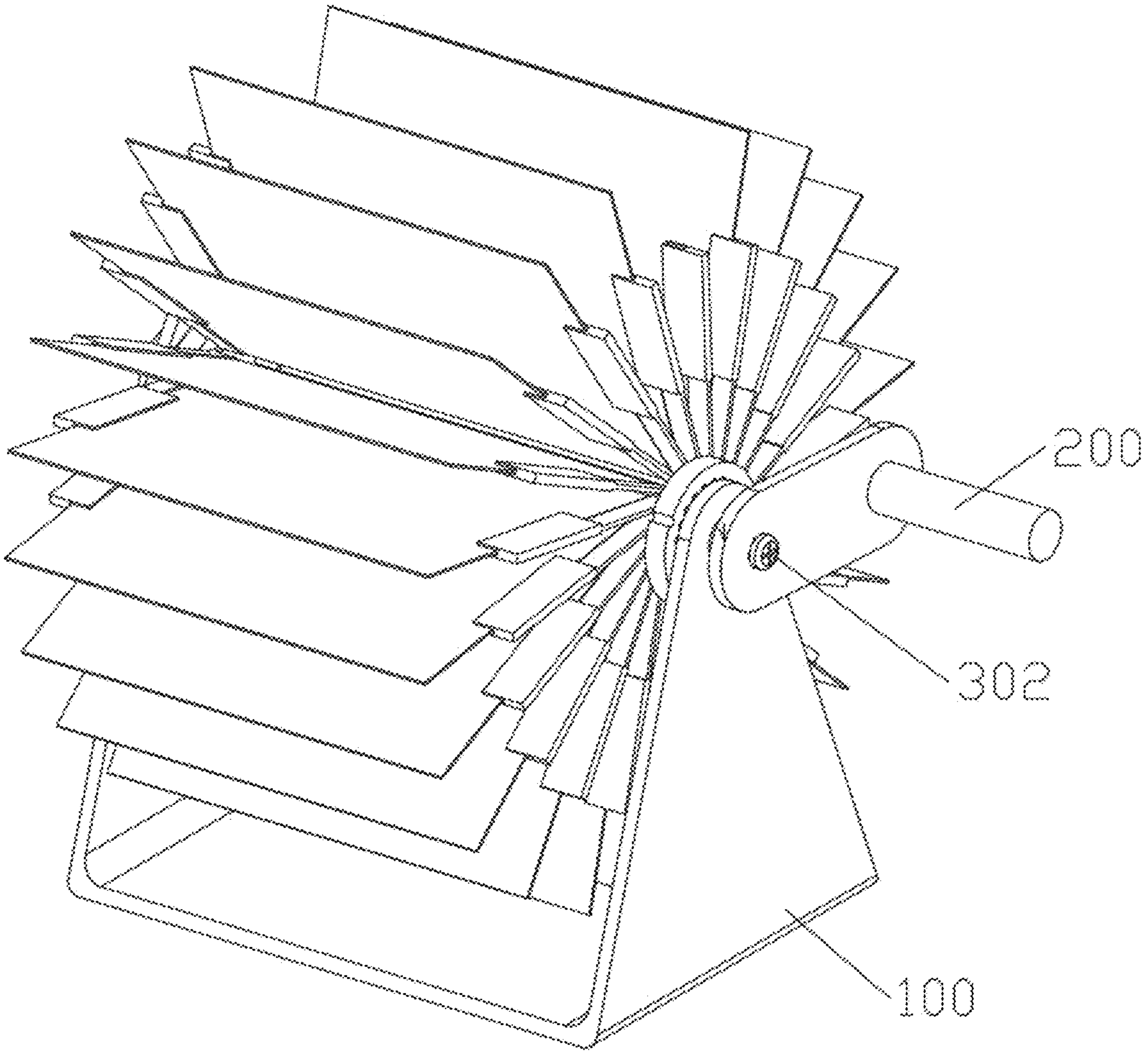
FIG. 3 is another perspective view shown in a position of use with environmental subject matter thereof.
Figure 4:
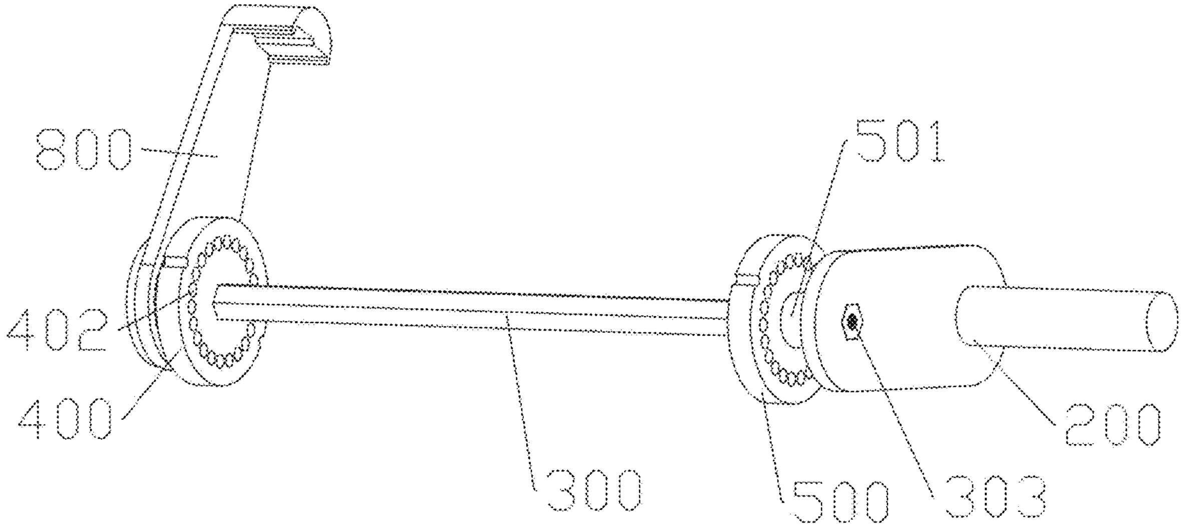
FIG. 4 is another perspective view in disassembly state thereof.
Figure 5:
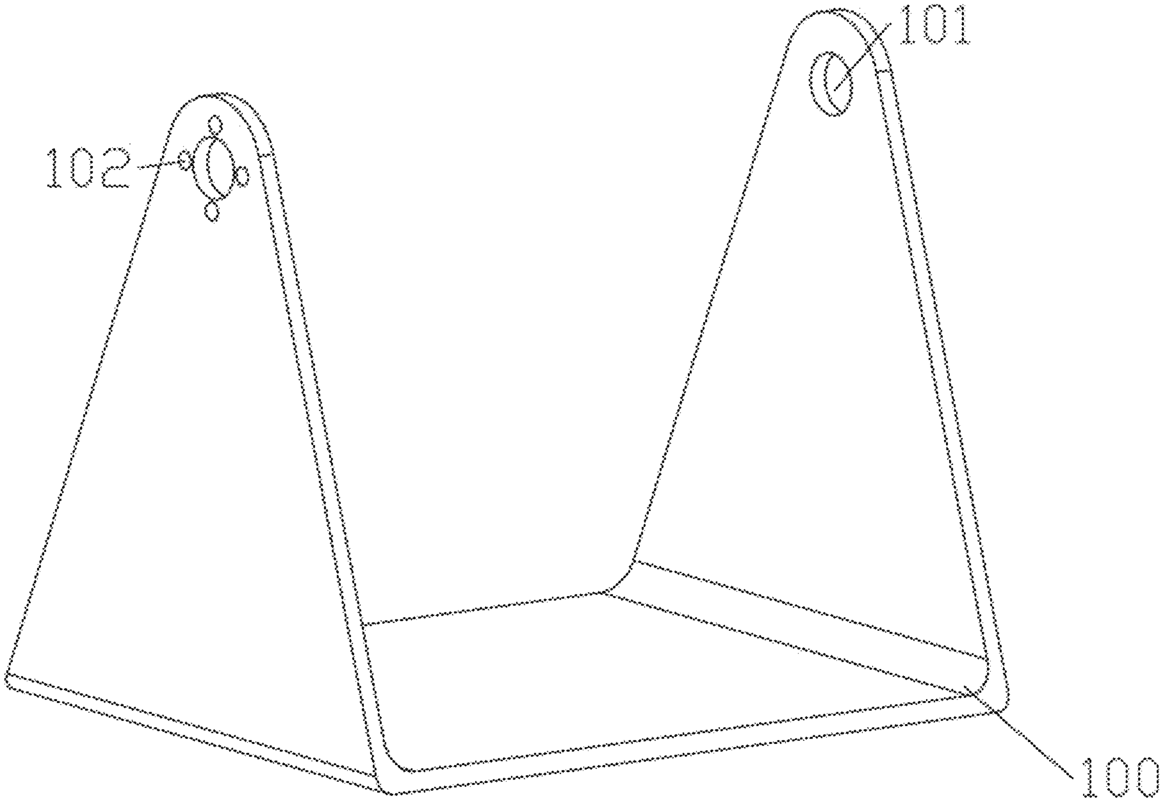
FIG. 5 is a perspective view of the U-shaped base.
Figure 6:
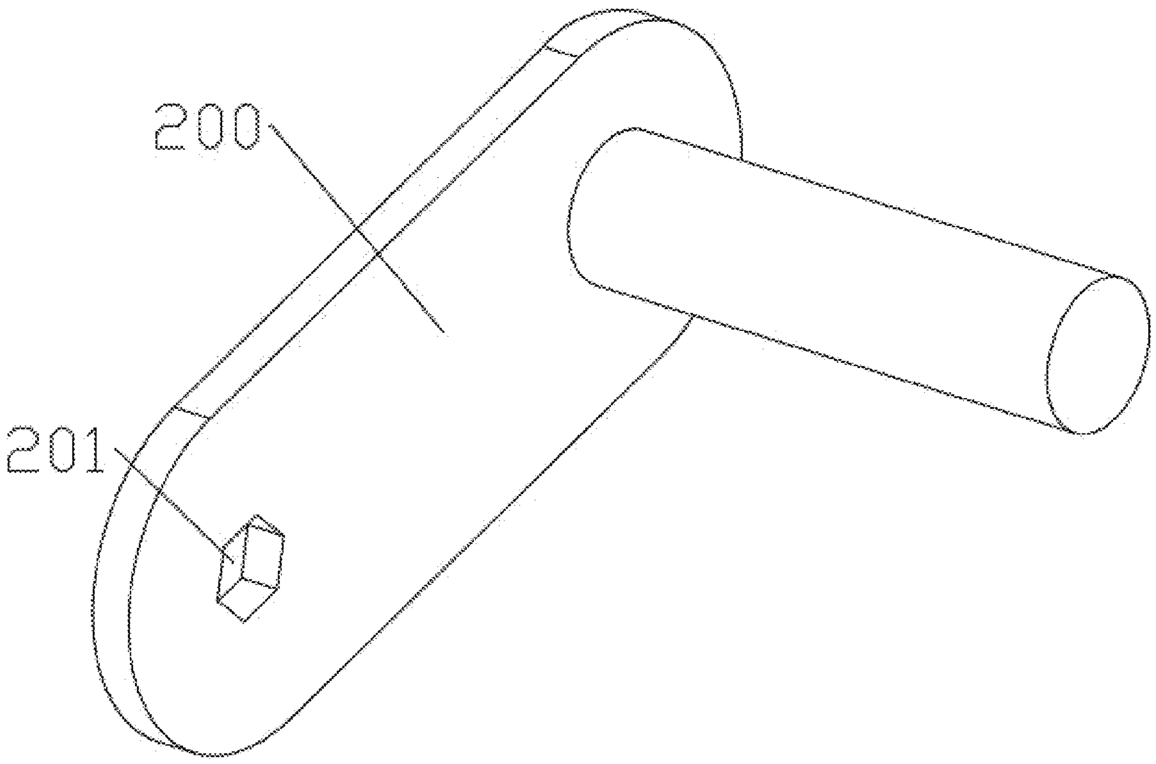
FIG. 6 is a perspective view of the crank handle.
Figure 7:
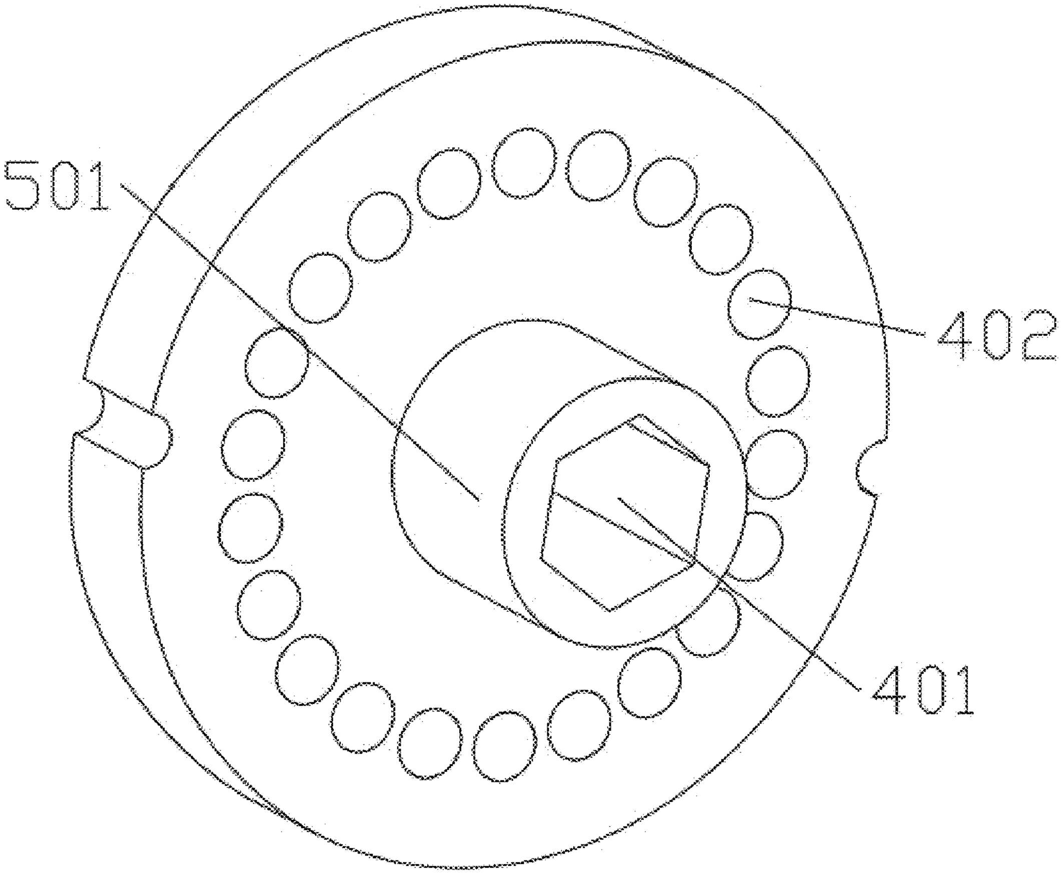
FIG. 7 is a perspective view of the right fixed round plate.
Figure 8:
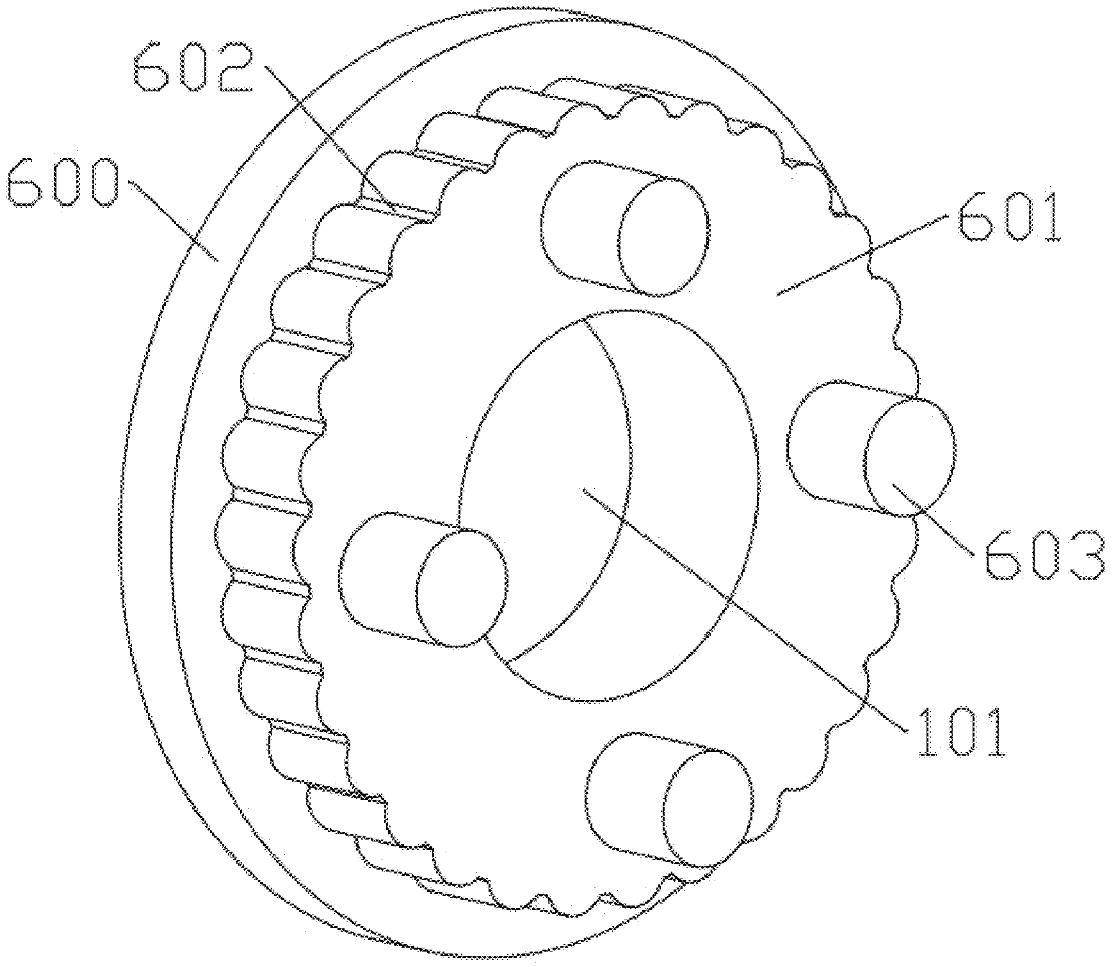
FIG. 8 is a perspective view of the damping plate.
Figure 9:
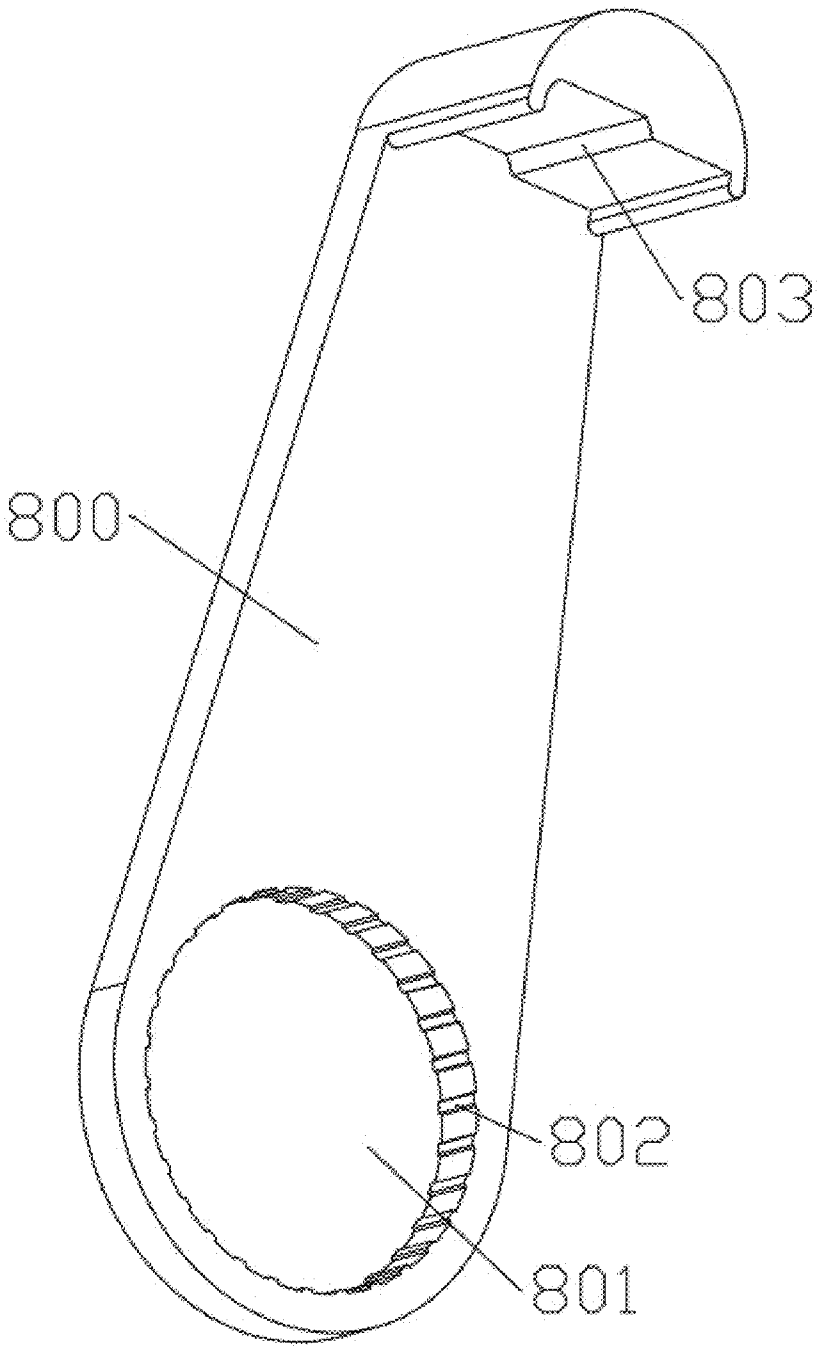
FIG. 9 is a perspective view of the damping arm.
Figure 10:
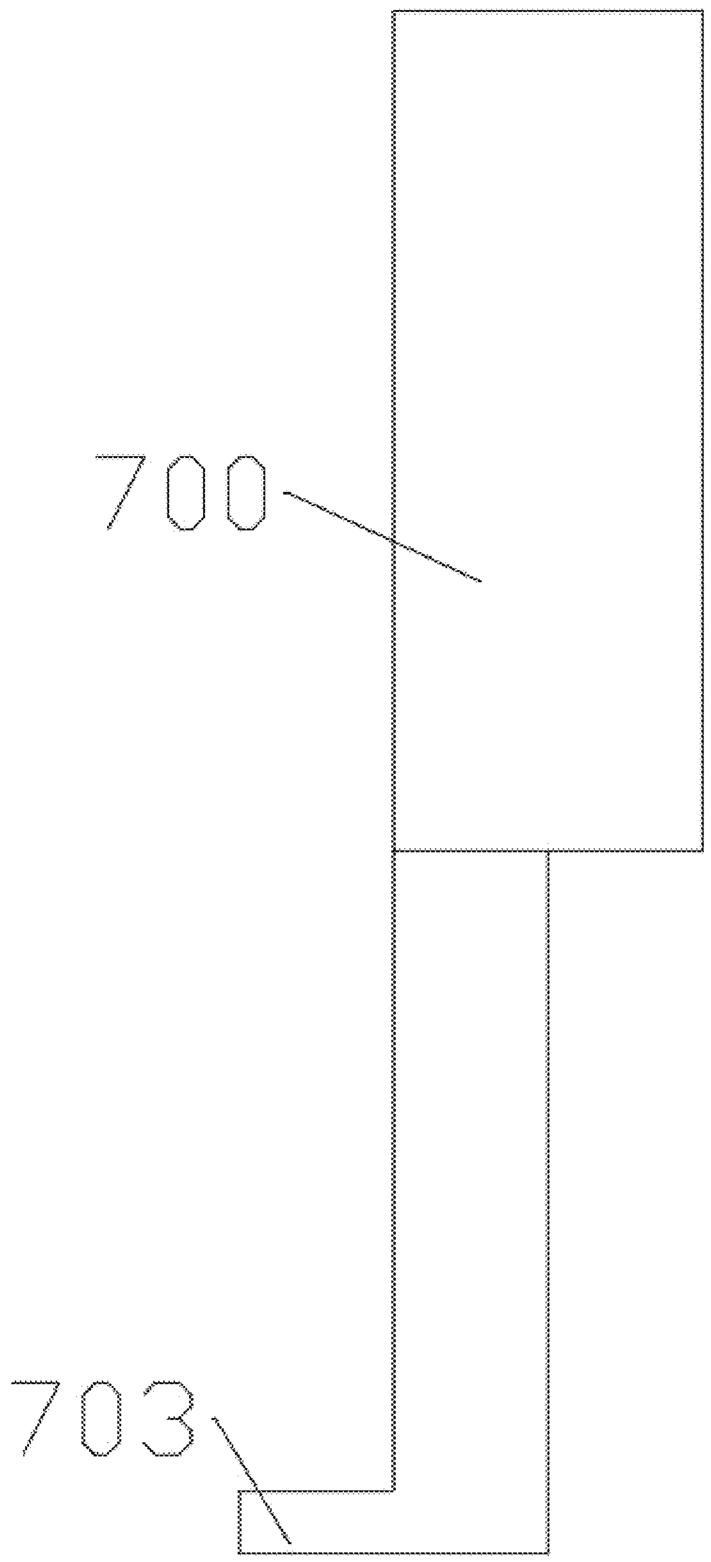
FIG. 10 is a front view of the side plug plate.
Figure 11:
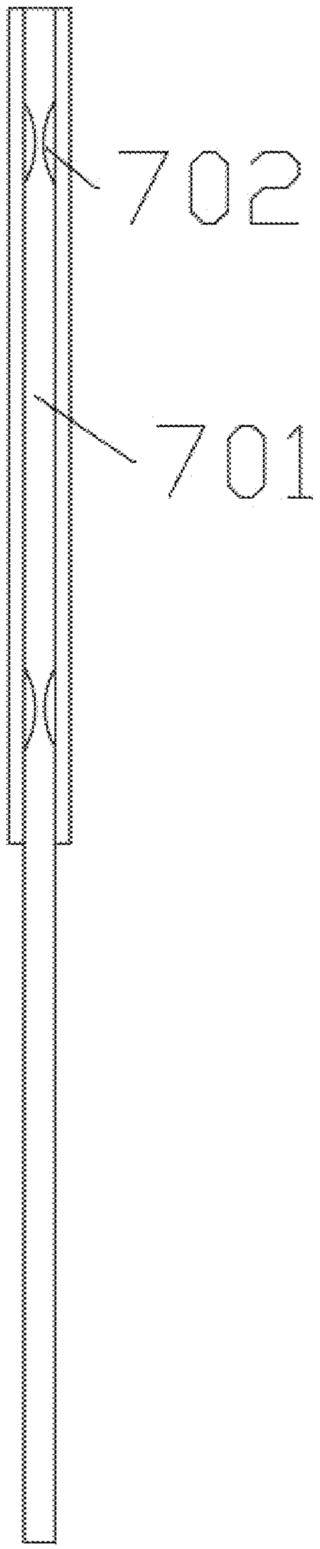
FIG. 11 is a side view of the side plug plate thereof.

As shown in FIGS. 1-11, a flip screen with replaceable materials and adjustable screen tilt angle, comprising a U-shaped base 100, a crank handle 200, a polygonal shaft 300, a left fixed roundplate 400, a right fixed round plate 500, a damping plate 600, a side plug plate 700 and a damping arm 800, wherein a round hole 101 is provided on the upper end of the U-shaped base 100 and the damping plate 600, and the round hole 101 passes through the U-shaped base 100 and the damping plate 600 respectively, the polygonal shaft 300 is arranged in the round hole 101 on the U-shaped base 100, and the round holes 101 are extended from both ends of the polygonal shaft 300, and a connecting rod 501 is provided on one side of the right fixed round plate 500; wherein the right fixed round plate 500 and the left fixed roundplate 400 are both provided with a first polygonal hole 401, the first polygonal hole 401 on the right fixed round plate 500 passes through the connecting rod 501, the left fixed roundplate 400, the right fixed round plate 500 and the connecting rod 501 are all sleeved on the polygonal shaft 300 through the first polygonal hole 401, the connecting rod 501 passes through the round hole 101 and extends to the outside of the U-shaped base 100, the left fixed roundplate 400 and the right fixed round plate 500 are both located on the inside of the U-shaped base 100, and the left fixed roundplate 400 and the right fixed round plate 500 are on the polygonal shaft 300. A sleeve 301 is provided at a position between the right and left fixed roundplates 500; a plurality of plug holes 402 are evenly provided on the left and right fixed round plates 400; the plug holes 402 are provided with side plug plates 700 in a detachable manner; a plurality of plug holes 102 are provided on one side of the U-shaped base 100; a sleeve 601 is provided on one side of the damping plate 600; a plurality of slots 602 are evenly provided on the circumference of the sleeve 601; a plurality of plug rods 603 are provided on the sleeve 601; the plug rods 603 and the plug holes 102 are connected and matched; a installation hole 801 is provided at the lower end of the damping arm 800; 1, a plurality of card plates 802 are evenly arranged on the inner wall of the installation hole 801, the damping arm 800 is rotatably connected to the sleeve 601 through the installation hole 801, the card plate 802 cooperates with the card slot 602 to position and adjust the angle of the damping arm 800, the damping arm 800 is provided with a limit slot 803 at the upper end, the limit slot 803 cooperates with the upper end of the corresponding side plug plate 700 to position the side plug plate 700, the crank handle 200 is provided with a second polygonal slot 201, the crank handle 200 is connected and cooperated with the polygonal shaft 300 through the second polygonal slot 201;

wherein an installation slot 701 is provided on one side of the upper end of the side plug plate 700.

The bottom of the side plug plate 700 is provided with a plug rod 703, the plug rod 703 and the plug-in hole 402 are connected and matched, and the inner walls on both sides of the installation slot 701 are provided with a plurality of protrusions 702

The crank handle 200 and the damping arm 800 are respectively located on two sides of the U-shaped base 100.

The two ends of the polygonal shaft 300 are provided with screw holes 303, and bolts 302 are arranged in the screw holes 303. One of the bolts 302 fixes the crank handle 200, and the other bolt 302 limits the polygonal shaft 300 to prevent the polygonal shaft 300 from slipping out of the round hole 101 of the damping plate 600.

When in use, first insert the two ends of the picture into the installation slots 701 of the side plug plates 700 on the left fixed round plate 400 and the right fixed circular plate 500, and then manually rotate the damping arm 800. Since the plug rod 603 on the sleeve 601 is connected and matched with the socket 102, the sleeve 601 will not rotate, and only the damping arm 800 will rotate. When the damping arm 800 is rotated to a suitable position, the clamping plate 802 will cooperate with the clamping slot 602, thereby fixing and limiting the damping arm 800, so that the damping arm 800 is firmly fixed at the adjusted position; then the upper end of one of the side plug plates 700 for fixing the picture can be clamped in the limiting slot 803 above the damping arm 800, and then the side plug plate 700 can be fixed, and the picture page turning screen can also be fixed;

When the angle of the flip screen needs to be adjusted, the manual rotation damping arm 800 can be rotated in the above manner to adjust the angle of the flip screen.

To adjust the different picture flipping screens, crank handle 200 to rotate the polygonal shaft 300 and sleeve 301. The rotation of polygonal shaft 300 will then drive the left fixed round plate 400, the right fixed round plate 500, and the side plug plate 700, allowing the picture flipping screen to turn. The upper end of the side plug plate 700 on one side of the corresponding picture flipping screen is designed to fit securely into limit slot 803.

The invention claimed is:

1. A flip screen with replaceable materials and adjustable screen tilt angle, comprising a U-shaped base, a crank handle, a polygonal shaft, a left fixed round plate, a right fixed round plate, a damping plate, a side plug plate and a damping arm, wherein a round hole is provided on the upper end of the U-shaped base and the damping plate, and the round hole passes through the U-shaped base and the damping plate respectively, the polygonal shaft is arranged in the round hole on the U-shaped base, and the round holes are extended from both ends of the polygonal shaft, and a connecting rod is provided on one side of the right fixed round plate; wherein the right fixed round plate and the left fixed round plate are both provided with a first polygonal hole, the first polygonal hole on the right fixed round plate passes through the connecting rod, the left fixed round plate, the right fixed round plate and the connecting rod are all sleeved on the polygonal shaft through the first polygonal hole, the connecting rod passes through the round hole and extends to the outside of the U-shaped base, the left fixed round plate and the right fixed round plate are both located on the inside of the U-shaped base, and the left fixed round plate and the right fixed round plate are on the polygonal shaft; wherein a sleeve is provided at a position between the right and left fixed round plates; a plurality of plug holes are evenly provided on the left and right fixed round plates; the plug holes are provided with side plug plates in a detachable manner; a plurality of plug holes are provided on one side of the U-shaped base; a sleeve is provided on one side of the damping plate; a plurality of slots are evenly provided on the circumference of the sleeve; a plurality of plug rods are provided on the sleeve; the plug rods and the plug holes are connected and matched; a installation hole is provided at the lower end of the damping arm; wherein a plurality of card plates are evenly arranged on the inner wall of the installation hole, the damping arm is rotatably connected to the sleeve through the installation hole, the card plate cooperates with the card slot to position and adjust the angle of the damping arm, the damping arm is provided with a limit slot at the upper end, the limit slot cooperates with the upper end of the corresponding side plug plate to position the side plug plate, the crank handle is provided with a second polygonal slot, the crank handle is connected and cooperated with the polygonal shaft through the second polygonal slot;

wherein an installation slot is provided on one side of the upper end of the side plug plate.

2. The flip screen with replaceable materials and adjustable screen tilt angle of claim 1, wherein the bottom of the side plug plate is provided with a plug rod, the plug rod and the plug-in hole are connected and matched, and the inner walls on both sides of the installation slot are provided with a plurality of protrusions.

3. The flip screen with replaceable materials and adjustable screen tilt angle of claim 1, wherein the crank handle and the damping arm are respectively located on two sides of the U-shaped base.

4. The flip screen with replaceable materials and adjustable screen tilt angle of claim 1, wherein both ends of the polygonal shaft are provided with screw holes, and bolts are provided in the screw holes.

* * * * *